(12) United States Patent
Mitsuoka et al.

(10) Patent No.: US 6,225,997 B1
(45) Date of Patent: May 1, 2001

(54) COMMUNICATION SYSTEM AND COMMUNICATION APPARATUS

(75) Inventors: Madoka Mitsuoka; Kazuki Matsui; Hiroyasu Sugano, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,329

(22) Filed: Jan. 5, 1999

(30) Foreign Application Priority Data

Feb. 17, 1998 (JP) .................................................. 10-034519

(51) Int. Cl.[7] ...................................................... G06F 3/00
(52) U.S. Cl. .......................... 345/348; 709/224; 709/203
(58) Field of Search .................................. 345/331, 348; 709/203, 208, 217, 219, 224; 707/531

(56) References Cited

U.S. PATENT DOCUMENTS

| | | | | |
|---|---|---|---|---|
| 5,924,109 | * | 7/1999 | Ackerman | 707/531 |
| 5,953,010 | * | 9/1999 | Kampe | 345/348 |
| 5,995,097 | * | 11/1999 | Tokumine | 345/331 |
| 5,995,106 | * | 11/1999 | Naughton | 345/357 |
| 6,014,135 | * | 1/2000 | Fernandes | 345/331 |

FOREIGN PATENT DOCUMENTS 10-190729     7/1998     (JP) .

\* cited by examiner

*Primary Examiner*—John Cabeca
*Assistant Examiner*—Kieu D. Vu
(74) *Attorney, Agent, or Firm*—Staas & Halsey LLP

(57) ABSTRACT

A communication system including a server having a state holding unit for holding variable state information and a state informing unit for holding a destination address of the state information to transmit the state information held by the state holding unit to the destination address. Further, a client's connected via a network to the server having plotting control for plotting one or more icons on an application, anyone of the icons being duplicatable between a plurality of mutually different applications, and the plurality of icons being increased in number by duplication. An icon management unit is provided for receiving the state information transmitted from the server to instruct the plotting control to reflect a state represented by the received state information on one or a plurality of icons plotted by the plotting control.

8 Claims, 9 Drawing Sheets

COMMUNICATION SYSTEM AND COMMUNICATION APPARATUS

BACKGROUND OF THE INVENTION

1. Field of the Invention

The present invention relates to a communication system capable of accessing a resource in which a state is dynamically changed on a network, and a communication apparatus incorporated into the communication system, said communication apparatus being adapted for receiving state information which is dynamically changed.

2. Description of the Related Art

Recently, there is increased particularly in company with generalization of a mobile computing a necessity of owning jointly through a network information representative of a resource, which will be dynamically altered in its state along with a development of network environment, for instance, the state of usage of a user computer.

On the other hand, hitherto, there is implemented a system in which resources, which will be dynamically altered in their state, for example, the state of utilization of the registered hosts, a stock price and the like are monitored, and state information is transmitted at regular intervals or at the time of alteration of the state through a network to an application which is operative on a specific client, and then displayed.

Further, there is implemented a system in which an object existing in a network is expressed by for example, an icon indicative of the associated address, and superposition of the icon and a desk-top object such as another icon, a window and the like makes it possible to perform a process (action) associated with the respective combination. It is possible to utilize such an object in another application by appending it to documents which are able to be distributed through the network, or drag and drop operations for the object into a desk-top of a window system and another window.

Since the utilization of information from resources, which will be dynamically altered in their state, on a network depends on a specific application, it is necessary for the utilization of such information to perform a complicated operation. In a window system capable of dealing with an icon representative of an object indicating a resource existing on a network, a function of dynamically reflecting a state of the resource is not implemented.

SUMMARY OF THE INVENTION

In view of the foregoing, it is therefore an object of the present invention to provide a communication system and a communication apparatus capable of readily grasping a dynamically changed state.

To attain the above-mentioned object, according to the present invention, there is provided a communication system comprising:

(1) a first communication apparatus having a state holding unit for holding variable state information and a state informing unit for holding a destination address of the state information to transmit the state information held by said state holding unit to the destination address; and (2) a second communication apparatus connected via a network to said first communication apparatus having a plotting control for plotting one or a plurality of icons on an application, anyone of the icons being duplicatable between a plurality of mutually different applications, and said plurality of icons being increased in number by duplication, and an icon management unit for receiving the state information transmitted from said first communication apparatus to instruct said plotting control to reflect a state represented by the received state information on one or a plurality of icons plotted by said plotting control.

According to the communication system of the present invention, an icon to be displayed reflects a state per se. Thus, it is possible to readily grasp a state and an alteration of the state. In the event that an icon is duplicated in different applications, the plotting control reflects a state on a plurality of icons. This feature makes it possible to duplicate the icon as one likes, and also possible to readily grasp a state and an alteration of the state from any icon of the icons which are increased in number by the duplication.

In the communication system as mentioned above, it is preferable that said icon management unit has means for designating said first communication apparatus frequency of transmission of the state information, and said state informing unit holds frequency information of transmission of the state information in association with the destination address, and transmits to the destination address the state information at frequency according to the frequency information held in association with the destination address.

This arrangement permits the second communication apparatus to designate frequency in accordance with a type of an application in which the above-mentioned state indication icon exist and an instruction from an application, so that state information is transmitted to the application and the like at suitable frequency, and thereby reducing the load of the network.

In the communication system as mentioned above, it is preferable that said state informing unit holds discrimination information between state information indicating a transmission permission in association with the destination address and state information indicating a transmission prohibition, and transmits to the destination address the state information indicating a transmission permission according to the discrimination information held in association with the destination address.

For example, in such a situation that a network including this communication system spreads in the office and out of the office as well, the above-mentioned arrangement makes it possible to differentiate state information to be distributed to a person in the office and state information to be distributed to a person out of the office. It is acceptable that the discrimination information is determined beforehand in accordance with the receiver destination of the state information. Also it is acceptable that the discrimination information is altered upon receipt of a password from the receiving side of the state information.

Further, in the communication system as mentioned above, it is preferable that said state holding unit alters the state information held by said state holding unit in accordance with information transmitted via the network.

According to this arrangement, for example, in a server and client system in which the first communication apparatus is a server and the second communication apparatus (plural) is a client, a dynamic state of some client is transmitted via a network to the server, and the server distributes the received dynamic state to another client, so that the clients can know mutually their states through icons.

To attain the above-mentioned object, according to the present invention, there is provided a communication apparatus connected to a network comprising:

a plotting control for plotting one or a plurality of icons on an application, anyone of the icons being duplicatable between a plurality of mutually different applications, and said plurality of icons being increased in number by duplication, and an icon management unit for receiving alterable state information transmitted via the network to instruct said plotting control to reflect a state represented by the received state information on one or a plurality of icons plotted by said plotting control.

This communication apparatus can be used as the second communication apparatus constituting the above-mentioned communication system.

In the above-mentioned communication apparatus, it is preferable that said plotting control consists of an assembly of plotting control units for plotting a plurality types of icons reflecting a state represented by same state information in mutually different modes, and said icon management unit selects a plotting control unit which is in charge of plotting an icon.

According to this feature, it is possible to vary the plotting control in charge of plotting an icon in accordance with a type of an application or an instruction of the application.

In the above-mentioned communication apparatus, it is preferable that said icon management unit causes said plotting control to erase an icon in accordance with an instruction.

Erasing the icon which becomes unnecessary makes it possible to reduce the load of the communication apparatus and the load of the network.

In the above-mentioned communication apparatus, it is preferable that said icon management unit receives information representative of the fact that an icon plotted by said plotting control and another object are coupled with each other to work in closer cooperation with said another object, and performs an operation according to a state reflected on said icon This feature makes it possible to perform a processing reflecting a dynamic state of an icon through an intuitive operation such as a drag and drop operation for the icon.

In the above-mentioned communication apparatus, it is preferable that said plotting control consists of an assembly of plotting control units for plotting icons on applications in accordance with the applications, and said icon management unit distributes the received state information to the plotting control units for plotting one or a plurality of icons on one or a plurality of applications, said plurality of icons being increased in number by duplication.

In this case, communication through a network is performed by a single icon management unit, and the icon management unit distributes necessary information to one or a plurality of plotting controls. This feature makes it possible to reduce the load of the network and the load of the information transmitting side.

DESCRIPTION OF THE PREFERRED EMBODIMENTS

Hereinafter, there will be described embodiments of the present invention.

Figure 1:
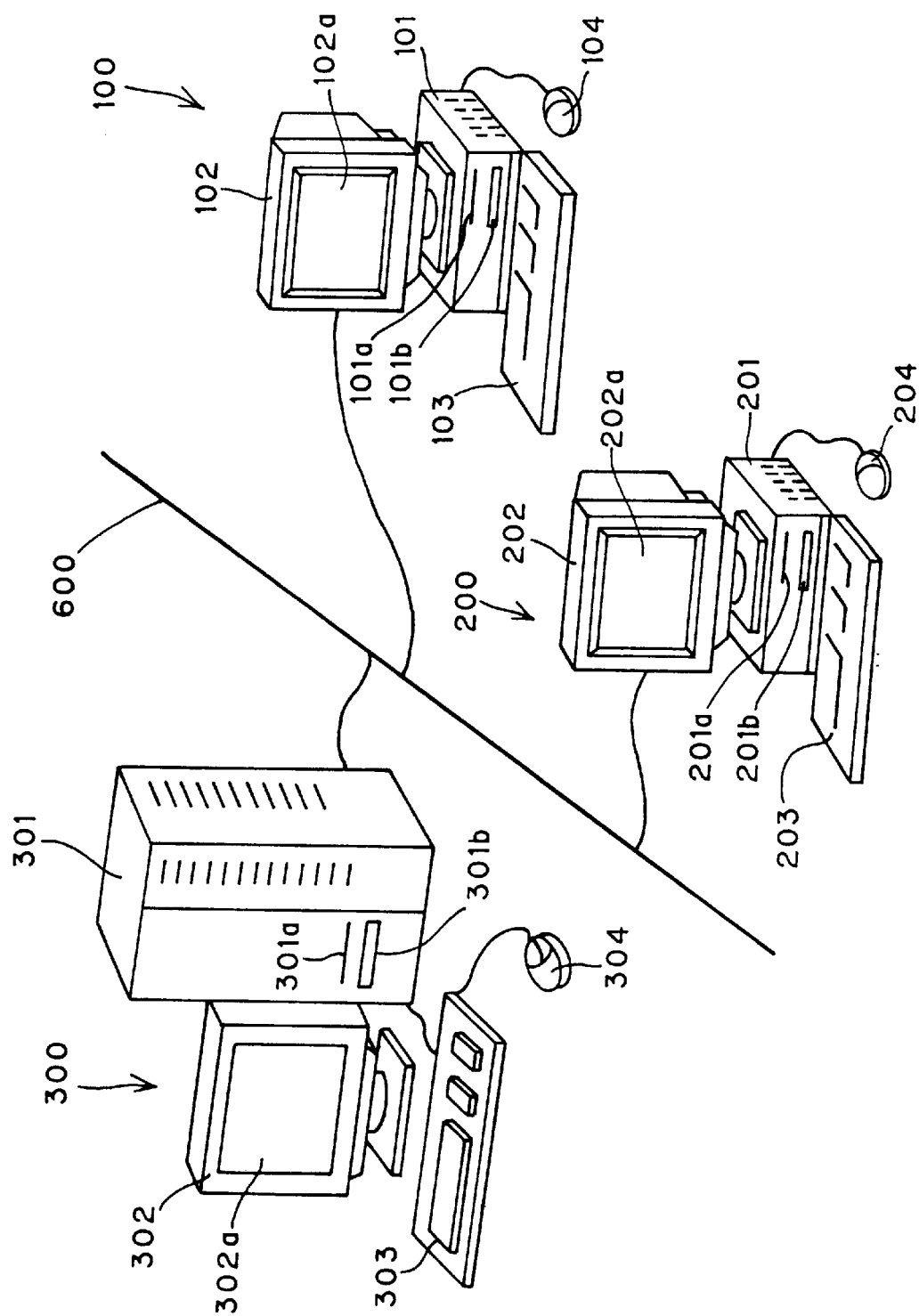
FIG. 1 is a typical illustration of a communication system according to an embodiment of the present invention.

FIG. 1 is a typical illustration of a communication system according to an embodiment of the present invention embodiment of the present invention.

In FIG. 1, there is shown by way of example two clients 100 and 200 and one server 300. The clients 100 and 200 and the server 300 are connected via a network 600 to one another.

Each of the clients 100 and 200 and the server 300 comprises a computer system. Each of the clients 100 and 200 corresponds to the second communication apparatus in the communication system of the present invention. The server 300 corresponds to the first communication apparatus in the communication system of the present invention. Each of the clients 100 and 200 also corresponds to the communication apparatus of the present invention.

The clients 100 and 200 and the server 300 respectively comprise: main frames 101, 201 and 301 each including a CPU, a main storage unit, a hard disk, a communication board and the like; image display units 102, 202 and 302 for displaying images on display screens 102a, 202a and 302a in accordance with instructions from the main frames 101, 201 and 301, respectively; keyboards 103, 203 and 303 for inputting operator's instructions to the computers 100, 200 and 300, respectively; and mouses 104, 204 and 304 for inputting instructions associated with icons and the like displayed at positions designated on the display screens 102a, 202a and 302a, respectively.

The main frames 101, 201 and 301 respectively have loading inlets 101a, 101b; 201a, 201b; and 301a, 301b, into which floppy disks and CDROMs (not illustrated) are loaded, respectively. And the main frames 101, 201 and 301 incorporates thereinto floppy disk drives and CDROM drives for driving floppy disks and CDROMs loaded through the loading inlets 101a, 101b; 201a, 201b; and 301a, 301b, respectively.

Figure 2:
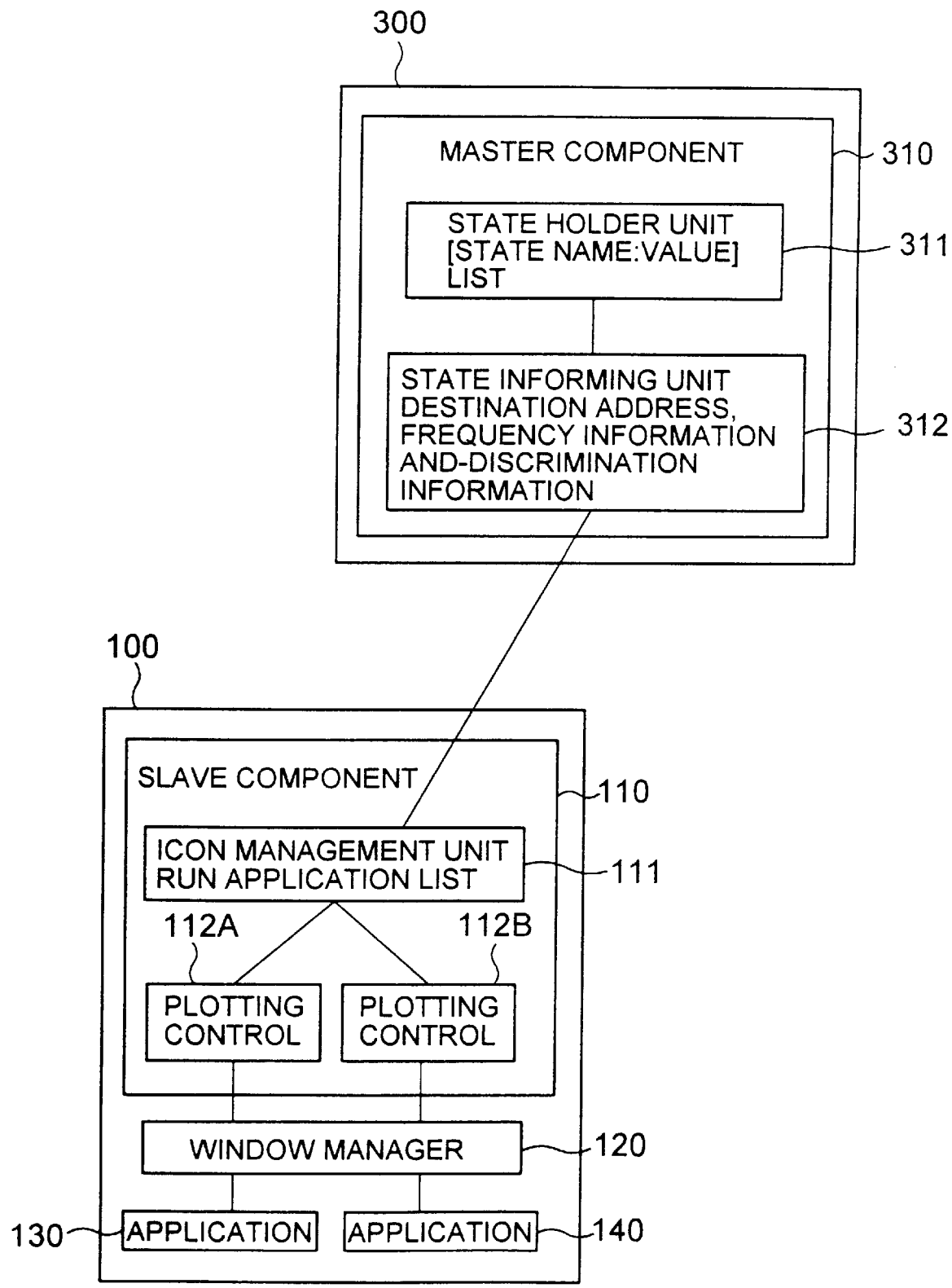
FIG. 2 is a schematic diagram showing a functional structure of a communication system according to an embodiment of the present invention.

FIG. 2 is a schematic diagram showing a functional structure of a communication system according to an embodiment of the present invention. Here, it is assumed that a communication is performed between the server 300 and the client 100 show in FIG. 1. Incidentally, it is assumed that the client 200 show in FIG. 1 has the same structure as the client 100.

The server 300 has a master component 310 which comprises a state holder unit 311 and a state informing unit 312.

The state holder unit 311 holds alterable state information. According to the present embodiment, the state information consists of a pair of a name of a state and a value of the state, and the alteration of the value of the state implies the change of the state. For example, in a stock price display system, a name of a state corresponds to a name of a company, and a value of the state corresponds to the current stock price of the company.

The state holder unit 311 holds a large numbers of state information each consisting of a pair of a name of a state and a value of the state as mentioned above in form of a list.

The state informing unit 312, which is provided on the master component 310 of the server 300, holds in form of a list a combination of a destination address of state information, frequency information associated with the destination address, and discrimination information associated with the destination address. The state informing unit 312 transmits the state information held in the state holder unit 311 to the destination addresses on the list. At that time, when the frequency information associated with the destination address is held, the state informing unit 312 transmits the state information to the destination addresses at the frequency indicated by the frequency information. The discrimination information serves to discriminate between state information which is permitted to be transmitted to the destination address, and state information which is inhibited from being transmitted to the destination address. In order to transmit the state information to the destination address, the state informing unit 312 refers to the discrimination information associated with the destination address and transmits only the state information permitted by the state information to the destination address.

The client 100 has a slave component 110, a window manager 120 and duplicate applications (typically two ones are shown) 130 and 140.

The slave component 110 has an icon management unit 111 and plotting controls 112A and 112B. The plotting control is provided on each icon. When an icon is duplicated, the plotting control is also duplicated, or alternatively another plotting control for the duplicated icon is driven. FIG. 2 shows typically two plotting controls.

Each of the plotting controls 112A and 112B basically serves to plot the icon. The icon management unit 111 basically receives the state information transmitted from the server 300, and instructs the plotting controls 112A and 112B to reflect the states represented by the received state information on the icons plotted by the plotting controls 112A and 112B, respectively. Thus, the plotting controls 112A and 112B reflect the states on the associated icons in accordance with instructions, respectively.

The window manager 120 serves to perform a display control for a window while mediating between the slave component 110 and the applications 130 and 140.

Figure 3:
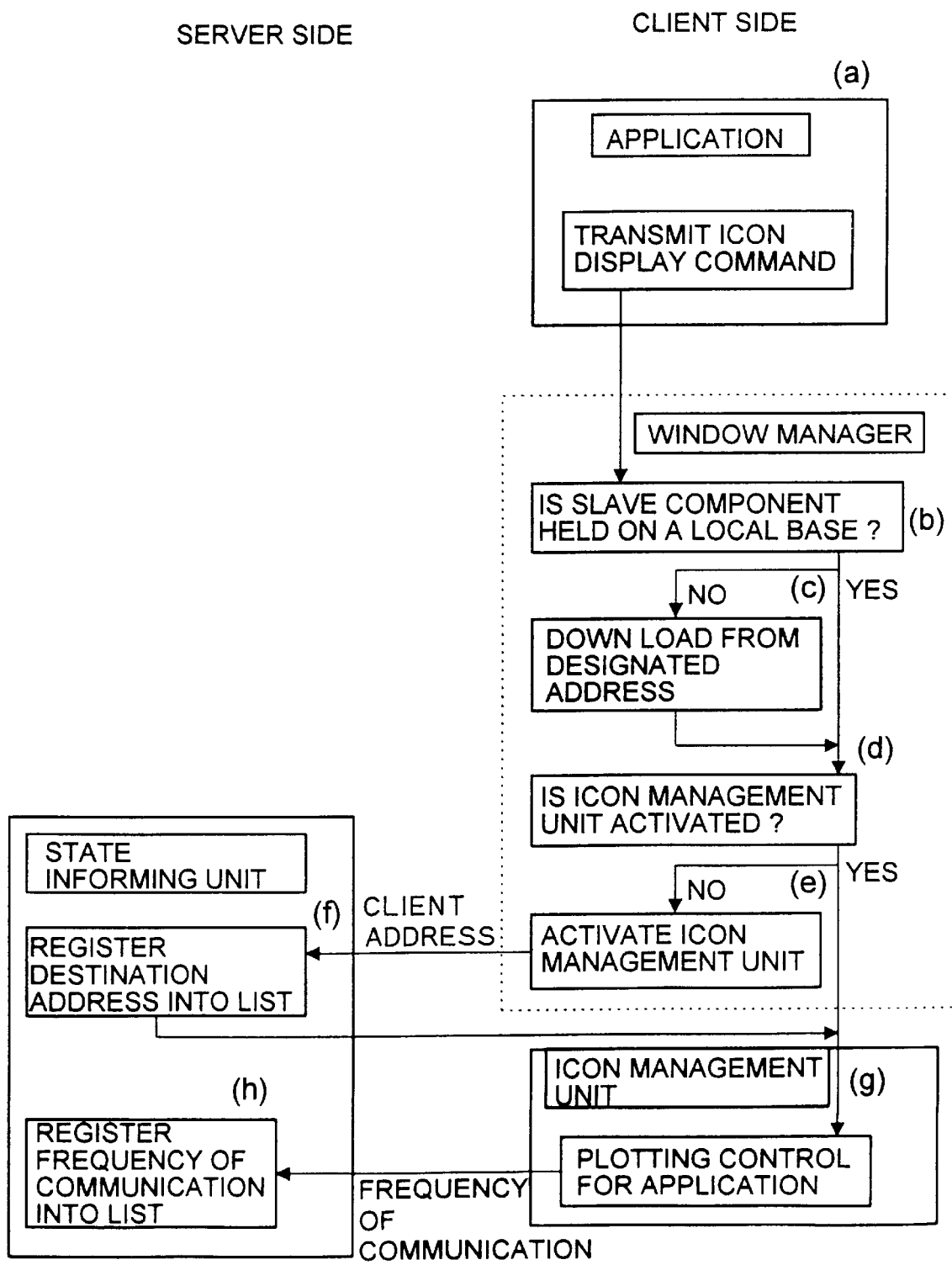
FIG. 3 is a view useful for understanding the procedure of processing for an icon display in the communication system shown in FIG. 2.

FIG. 3 is a view useful for understanding the procedure of processing for an icon display in the communication system shown in FIG. 2.

First, in step (a), an application transmits an icon display command to the window manager (for example, in case of WWW browser, when a script for designating an object of HTML (Hyper Text Markup Language) is read, a display command is transmitted to the window manager). Then window manager activates the associated icon management unit.

In order to activate the icon management unit, the window manager decides as to whether the client possesses the slave component on a local basis, that is, in the client per se (step (b)), and if the client does not possess the slave component, the window manager down loads the slave component from the designated address (step (c)).

Next, the window manager decides as to whether the icon management unit is activated (step (d)), and if the icon management unit is not activated, the window manager activates the icon management unit (step (e)). The icon management unit thus activated informs a state informing unit of the server side of the client address, so that the state informing unit registers the informed client address into the list in the form of a destination address (step (f)).

Next, the icon management unit activates a plotting control associated with the application so that the plotting control informs the state informing unit of frequency in communication (step (g)).

The state informing unit registers the informed frequency in communication into the list in association with the client address (step (h)).

Figure 4:
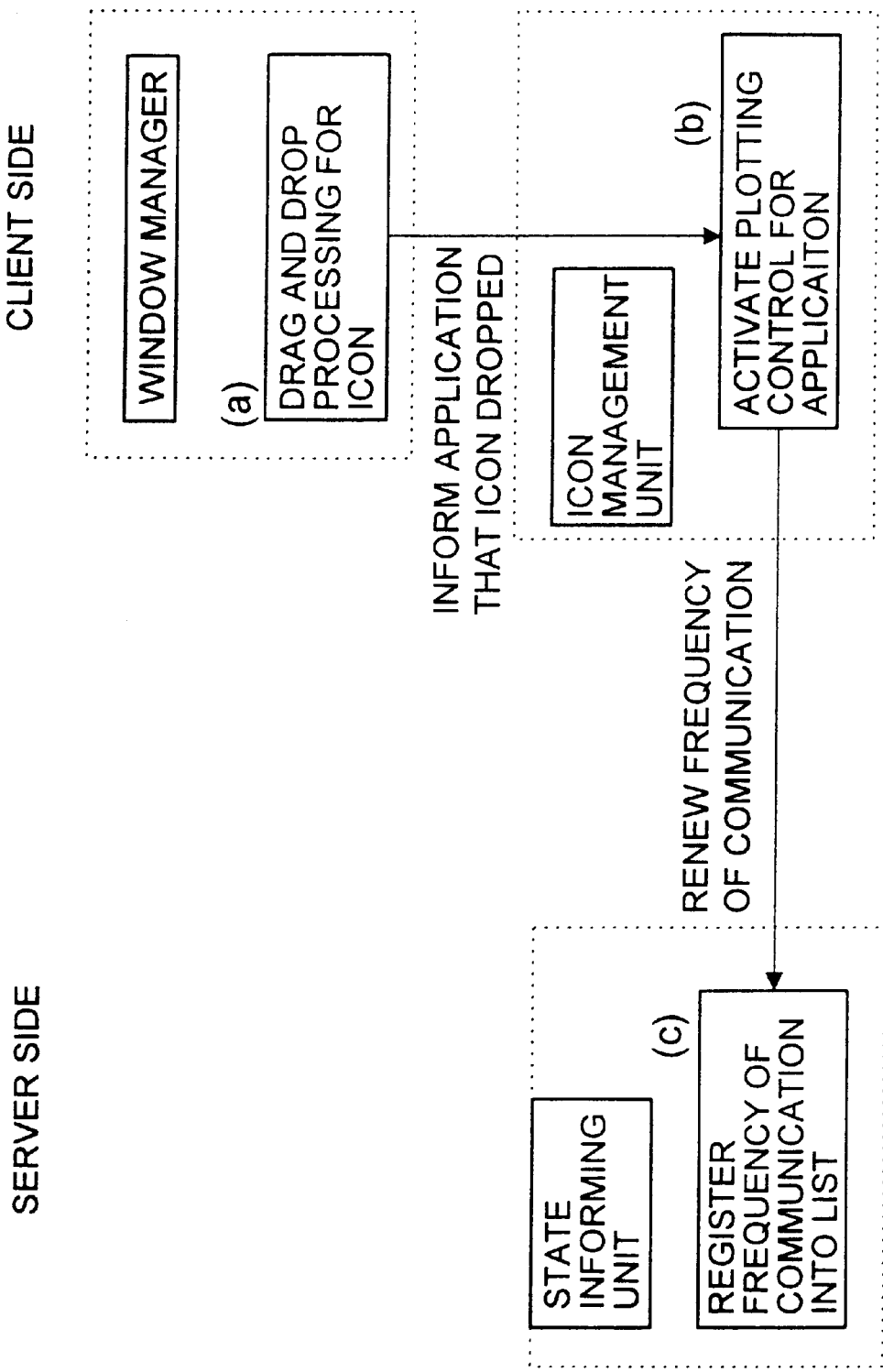
FIG. 4 is a view useful for understanding the procedure of processing for an icon duplication in the communication system shown in FIG. 2.

FIG. 4 is a view useful for understanding the procedure of processing for an icon duplication in the communication system shown in FIG. 2.

The window manager detects a drag and drop processing for an icon on applications (an icon is subjected to picking by the mouse 104 of the client 100 shown in FIG. 1, and while the mouse button is depressed, the mouse is moved (that is, the icon under picking is translated), and the mouse button is released after the icon is moved to a predetermined position) to duplicate the icon (step (a)). Information such that the icon has been duplicated is informed the icon management unit. Upon receipt of such information, the icon management unit activates the plotting control associated with the application involved in the duplication of the icon (step (b)). In the event that the application requires the state informing unit at the server side to transmit the state information with frequency in communication which is higher than that now registered in the state informing unit in association with the client, the activated plotting control informs the state informing unit at the server side of such higher frequency in communication.

The state informing unit at the server side registers frequency in communication informed by the client in association with the address of the client (step (b)).

The above-mentioned structure referring to FIGS. 2–4 makes it possible to express information of a resource, which is dynamically changed in the state on a network, with a duplicatable icon, and thereby contributing to an improvement of operability and the promotion of the distribution of information.

Figure 5:
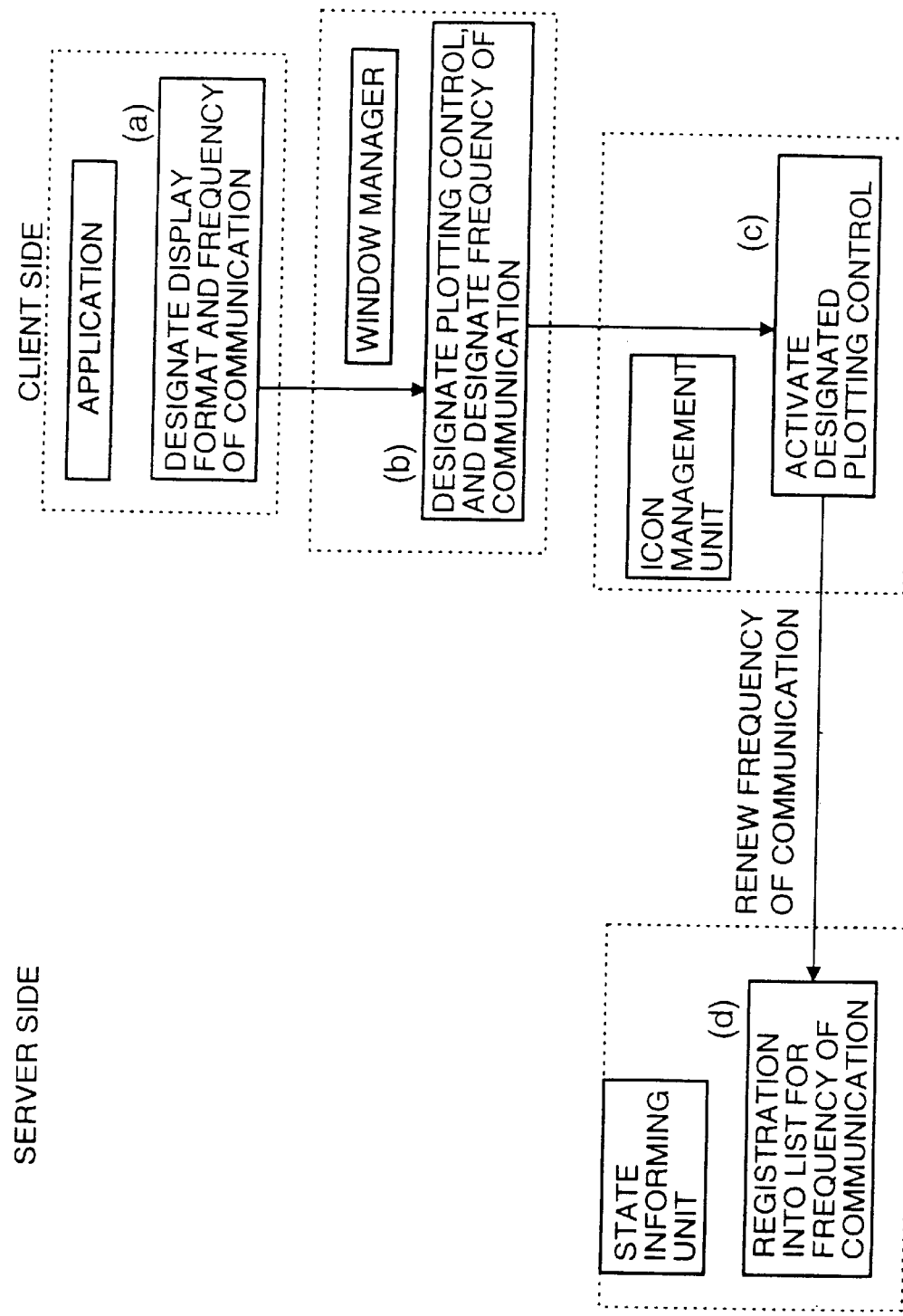
FIG. 5 is a view useful for understanding the procedure of processing for a designation of a display format of an icon and frequency in communication from an application.

FIG. 5 is a view useful for understanding the procedure of processing for a designation of a display format of an icon and frequency in communication from an application.

An application designates a display format of an icon and frequency in communication, for example, through recognition of a type of a computer on which oneself is operated, so that an icon display according to that computer's performance is implemented (step (a)).

Upon receipt of the instruction, the window manager designates to the icon management unit a plotting control in charge of plotting of the designated display format of icon, or alternatively designates frequency in communication (step (b)).

The icon management unit activates the plotting control designated by the window manager, and the plotting control thus activated informs the server side of frequency in communication in the event that the frequency in communication designated by the window manager is higher than any previous frequency in communication to the client, and in the event that an icon, which indicates the state information, does not exist in other than that application (step(c)).

The state informing unit at the server side registers into the list the frequency in communication received from the client in association with an address of the client (step(d)).

As shown in FIGS. 3 and 4, the window manager activates a different plotting control in accordance with the type of the application issued an icon display command. This feature makes it possible to change the display format of information. For example, in the application for a desktop high performance computer, an icon of a full animation is displayed, and on the other hand, in application for a mobile terminal, an icon, in which a display is simply renewed once in a while, is displayed. Further, as shown in FIG. 5, it is possible also to alter the display format of information in accordance with the instruction from the application. For example, the application recognizes a type of a computer on which oneself is operated, so that an icon display according to that computer's performance is implemented. Thus, it is possible to display information in the optimum format according to the application.

Further, as shown in FIGS. 3 and 4, the icon management unit informs the state informing unit at the server side of frequency in communication in accordance with a type of an application. This feature makes it possible to vary an amount of communication between the server and the client. Furthermore, as shown in FIG. 5, it is possible also to alter an amount of communication in accordance with the instruction from the application. For example, the application recognizes type and environment of a computer on which oneself is operated, and in the event that communication means is connected to the network in the form of a movable phone, a PHS (Personal Handyphone System) and the like, an amount of communication is reduced. In this manner, an amount of communication is varied between the application in which renewal of information on a real time basis is needed and another application which needs no such renewal of information. This feature makes it possible to reduce the load of the network.

Figure 6:
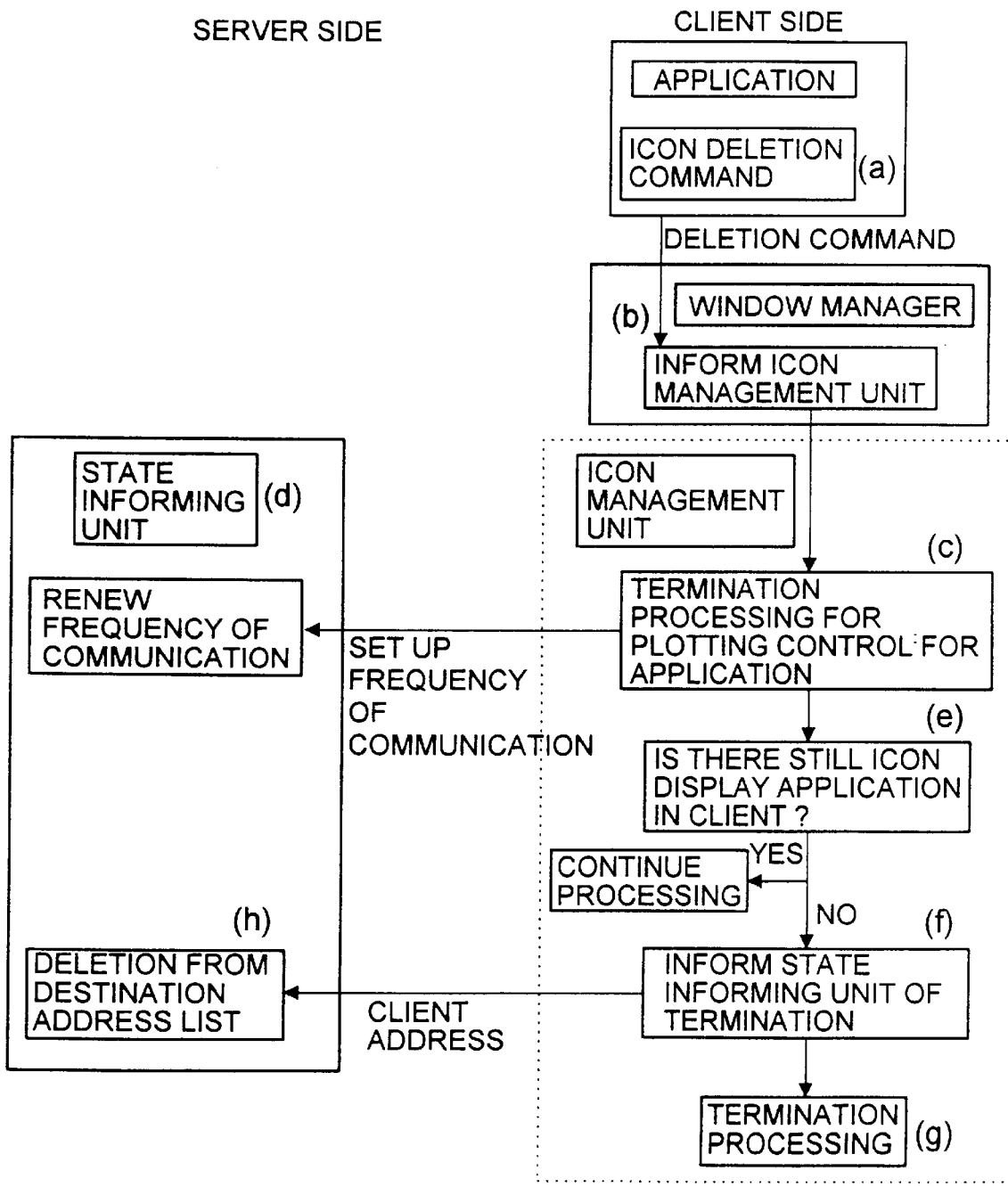
FIG. 6 is a view useful for understanding the procedure of processing for an icon deletion.

FIG. 6 is a view useful for understanding the procedure of processing for an icon deletion.

First, in a step (a), an application issues an icon deletion command. Then, in a step (b), a window manager informs an icon management unit of the icon deletion command.

The icon management unit performs a termination processing (a step (c)) to terminate an operation of a plotting control in charge of plotting of an icon of the application which issued the icon deletion command. When there is a need to alter frequency in communication according as the icon is deleted, the icon management unit informs a state informing unit at the server side of frequency in communication. The state informing unit renews the frequency in communication as to the client (a step (d)).

The icon management unit determines as to whether there is still remaining an application which needs to perform an icon display so that the state information is reflected into the client (a step (e)). When such an application remains, the processing for the remaining icon is prosecuted. On the other hand, when such an application does not remain, the icon management unit issues to the state informing unit at the server side a termination notification such that indication of icons, on which the state information is to be reflected, has been completely terminated (a step (f)).

Upon receipt of the termination notification, the state informing unit at the server side deletes an address of the client from the destination address list (a step (h)).

The icon management unit at the client side performs the termination processing for the icon management unit itself (a step (g)).

The procedure shown in FIG. 6 makes it possible to close communication of the state information from the server and reduce an amount of communication when a cancellation of the icon is performed.

Figure 7:
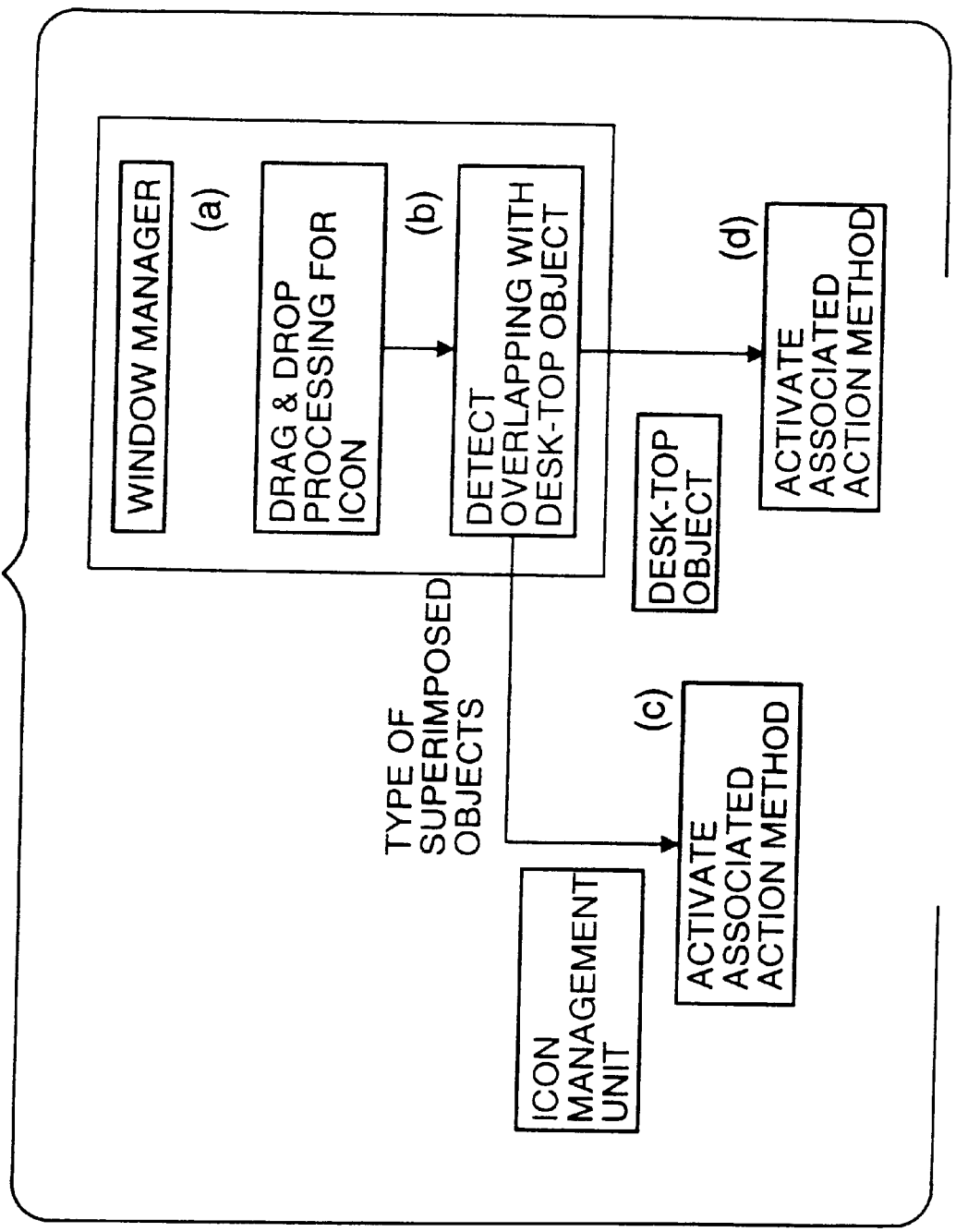
FIG. 7 is a view useful for understanding the procedure of a starting of an action method by a superimposition of an icon and a desk-top object.

FIG. 7 is a view useful for understanding the procedure of a starting of an action method by a superimposition of an icon and a desk-top object.

A window manager detects that the drag and drop processing for an icon is carried out (step (a)). And when a drop destination of the icon overlaps with a picture of a desk-top object, the window manager detects the overlapping and informs the icon management unit of a type of the overlapped object (step (b)).

The icon management unit activates an action method according to a state associated with the icon subjected to the drag and drop processing and in addition according to a type of the overlapped object (step (c)). Also at the side of the desk-top object, the associated action method is activated (step (d)).

For example, superimposing a state indication icon indicative of a telephone number of a some one's contact address (it is assumed that the telephone number of the person's contact address is changed as the person transfers) causes the icon management side to activate a method such that a telephone number of the person's current contact address associated with the state indication icon is informed, so that the telephone number is informed a telephone application to dial the informed telephone number.

In this manner, a superimposition of the icon and the desk-top object is detected, and a mapping processing for the icon management unit and the desk-top object is performed. This feature makes it possible to implement a processing reflecting the dynamic state of the icon through an intuitive operation such as a drag and drop.

Figure 8:
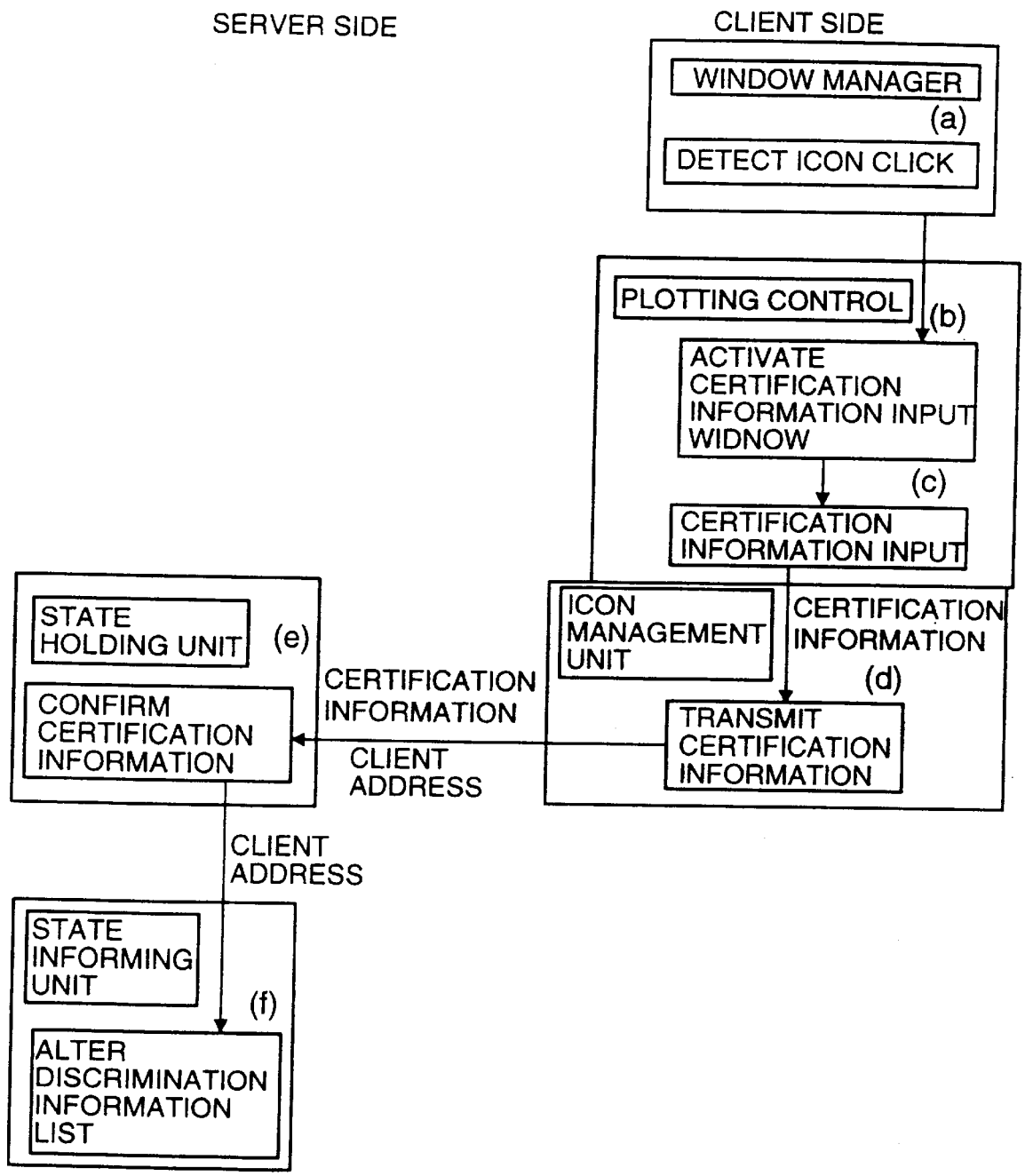
FIG. 8 is a view of an accessor control for controlling an access of state information at a server side.

FIG. 8 is a view of an accessor control for controlling an access of state information at a server side.

In a step (a), the window manager detects that an icon for opening a window for a certification information (password) input is clicked. Then, the plotting control associated with the icon activates the window for a certification information input (a step (b)). When the certification information (password) is fed to the window (a step (c)), an icon management unit transmits to the server side the certification information and the client address (a step(d)).

Then, a state holding unit at the server side determines as to whether the certification information is proper. When it is decided that the certification information is proper, the associated client address is informed a state informing unit (a step (e)). Upon receipt of the information, the state informing unit alters discrimination information for discriminating between state information in which transmission to the client is permitted and state information in which transmission to the client is prohibited, the discrimination information being associated with the client address, in such a manner that transmission of the state information in which transmission to the client is prohibited is released (a step (f)).

This arrangement makes it possible to determine information to be opened to the public and information not to be opened to the public in accordance with a client. For example, it is possible to determine items of information to be opened to the public and information to be opened to only the office.

Figure 9:
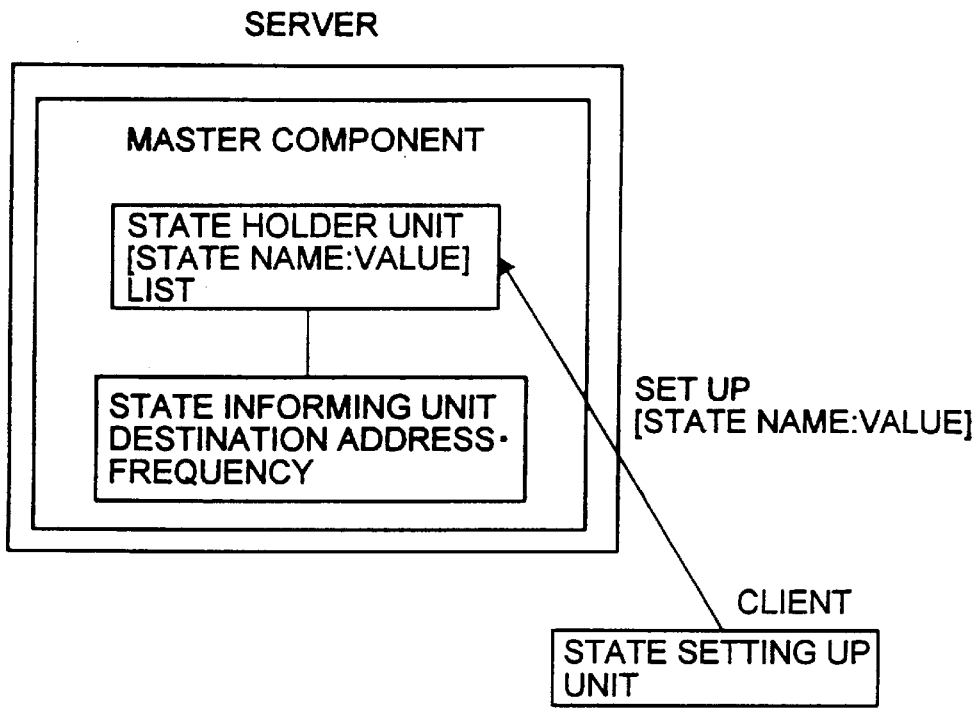
FIG. 9 is a view useful for understanding a way of setting up a state in which a network intervenes.

FIG. 9 is a view useful for understanding a way of setting up a state in which a network intervenes.

As shown in FIG. 9, a client has a state setting up unit for accessing a state holding unit of the server through a network to alter state information held in the state holding unit. This feature makes it possible for another client to monitor a state of the client or a change of the state on a state indication icon of one's own.

Figure 10:
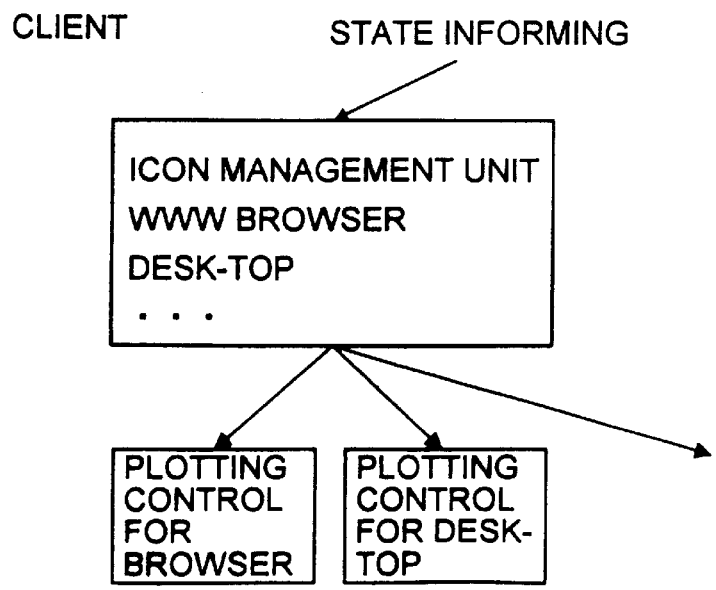
FIG. 10 is a view of a mechanism for a distribution of state information to a plotting control unit.

FIG. 10 is a view of a mechanism for a distribution of state information to a plotting control unit.

According to the present embodiment, some client has only one icon management unit which receives state information from the server side. This icon management unit distributes the received state information to a plurality of plotting controls. For example, in the event that the same object of icon is displayed on both a WWW browser and a desk-top on one client, it is sufficient to provide only one icon management unit for communication with the server side. This icon management unit informs of the state both the plotting control for plotting the icon on the WWW browser and the plotting control for plotting the icon on the desk-top.

According to this arrangement, as compared with a case where not only the plotting control but also the icon management unit are provided in association with the respective icon, it is possible to suppress an amount of communication on a network and an amount of processing in both the client and the server.

As mentioned above, according to the present invention, real time information from a resource on a network is reflected on an icon and the icon is duplicated. This feature makes it possible to effectively utilize the icon reflecting the state information thereon in a plurality of applications.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A communication system comprising:
    a first communication apparatus having a state holding unit for holding variable state information and a state informing unit for holding a destination address of the state information to transmit the state information held by said state holding unit to the destination address; and
    a second communication apparatus connected via a network to said first communication apparatus having a plotting control for plotting one or a plurality of icons on an application, anyone of the icons being duplicatable between a plurality of mutually different applications, and said plurality of icons being increased in number by duplication, and an icon management unit for receiving the state information transmitted from said first communication apparatus to instruct said plotting control to reflect a state represented by the received state information on one or a plurality of icons plotted by said plotting control, wherein said plotting control consists of an assembly of plotting control units for plotting a plurality types of icons reflecting a state represented by same state information in mutually different modes, and
    said icon management unit selects a plotting control unit which is in charge of plotting an icon.

2. A communication system according to claim 1, wherein said icon management unit has means for designating said first communication apparatus frequency of transmission of the state information, and
    said state informing unit holds frequency information of transmission of the state information in association with the destination address, and transmits to the destination address the state information at frequency according to the frequency information held in association with the destination address.

3. A communication system according to claim 1, wherein said state informing unit holds discrimination information between state information indicating a transmission permission in association with the destination address and state information indicating a transmission prohibition, and transmits to the destination address the state information indicating a transmission permission according to the discrimination information held in association with the destination address.

4. A communication system according to claim 1, wherein said state holding unit alters the state information held by said state holding unit in accordance with information transmitted via the network.

5. A communication apparatus connected to a network comprising:
    a plotting control for plotting one or a plurality of icons on an application, anyone of the icons being duplicatable between a plurality of mutually different applications, and said plurality of icons being increased in number by duplication, and an icon management unit for receiving alterable state information transmitted via the network to instruct said plotting control to reflect a state represented by the received state information on one or a plurality of icons plotted by said plotting control, wherein said plotting control consists of an assembly of plotting control units for plotting a plurality types of icons reflecting a state represented by same state information in mutually different modes, and
    said icon management unit selects a plotting control unit which is in charge of plotting an icon.

6. A communication apparatus according to claim 5, wherein said icon management unit causes said plotting control to erase an icon in accordance with an instruction.

7. A communication apparatus according to claim 5, wherein said icon management unit receives information representative of the fact that an icon plotted by said plotting control and another object are coupled with each other to work in closer cooperation with said another object, and performs an operation according to a state reflected on said icon.

8. A communication apparatus according to claim 5, wherein said plotting control consists of an assembly of plotting control units for plotting icons on applications in accordance with the applications, and
    said icon management unit distributes the received state information to the plotting control units for plotting one or a plurality of icons on one or a plurality of applications, said plurality of icons being increased in number by duplication.

* * * * *